United States Patent [19]
Gilligan

[11] 3,923,020
[45] Dec. 2, 1975

[54] THROTTLE CONTROL DEVICE FOR MOTOR VEHICLES

[75] Inventor: John E. Gilligan, Stockton, Calif.

[73] Assignee: Alert Control Company, Stockton, Calif.

[22] Filed: Feb. 11, 1974

[21] Appl. No.: 441,561

[52] U.S. Cl............... 123/103 C; 123/108; 180/108
[51] Int. Cl.²........................................ F02D 11/08
[58] Field of Search..... 123/103 C, 108; 180/105 R, 180/110, 108

[56] References Cited
UNITED STATES PATENTS

| | | | |
|---|---|---|---|
| 2,265,524 | 12/1941 | Fruth | 180/110 |
| 2,529,437 | 11/1950 | Weinberger | 123/108 X |
| 2,825,418 | 3/1958 | Kershman | 123/103 E X |
| 3,065,813 | 11/1962 | Bookout et al. | 180/108 |
| 3,092,090 | 6/1963 | Berninger | 180/108 X |
| 3,289,659 | 12/1966 | Koole | 123/103 C X |

FOREIGN PATENTS OR APPLICATIONS

| | | | |
|---|---|---|---|
| 751,217 | 8/1933 | France | 180/108 |
| 905,559 | 3/1954 | Germany | 123/103 C |
| 831,646 | 9/1938 | France | 180/108 |
| 403,476 | 12/1933 | United Kingdom | 180/108 |

Primary Examiner—Wendell E. Burns
Assistant Examiner—William C. Anderson
Attorney, Agent, or Firm—Roger B. Webster

[57] ABSTRACT

A device to automatically control the road speed of a motor vehicle to a predetermined maximum; such control being accomplished through the medium of instrumentalities associated with the engine throttle rod and operative to vary its effective length in response to the motor vehicle attaining such maximum road speed.

1 Claim, 4 Drawing Figures

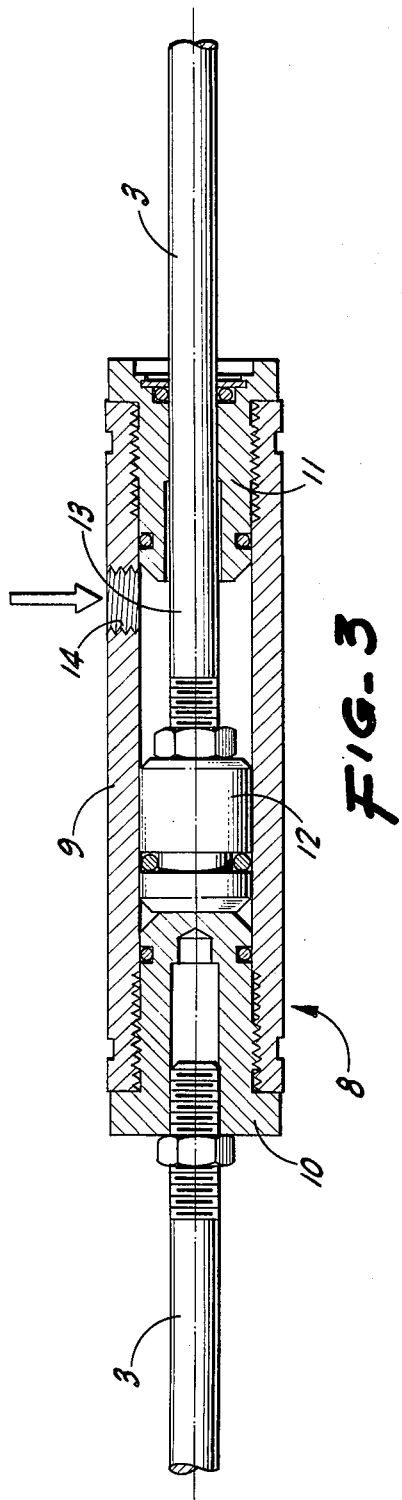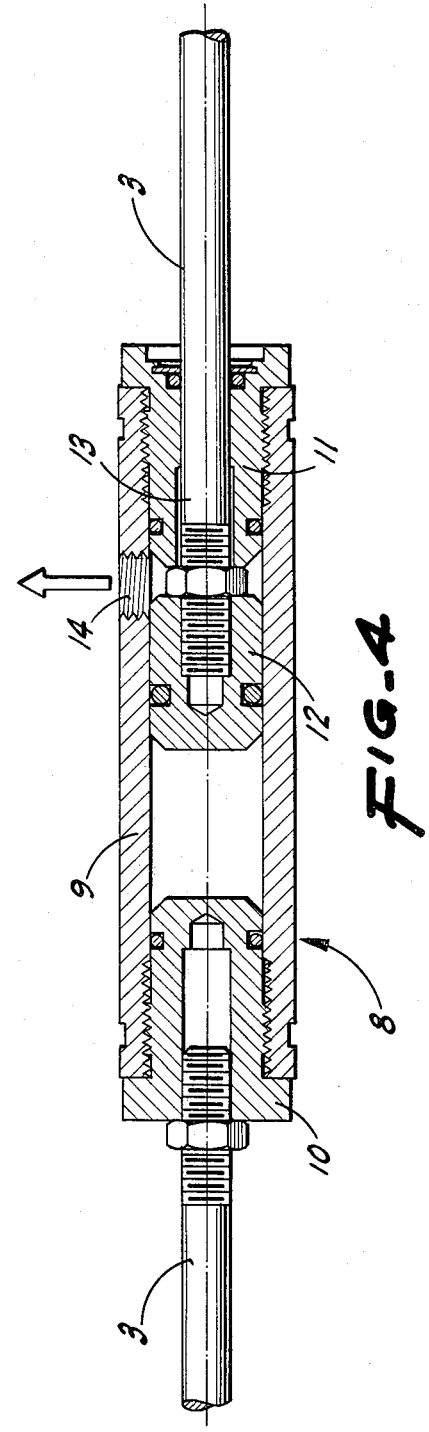

THROTTLE CONTROL DEVICE FOR MOTOR VEHICLES

BACKGROUND OF THE INVENTION

Heretofore numerous known forms of internal combustion engine speed controllers, for motor vehicles, controlled the engine either at the maximum governed r.p.m. or throughout the full r.p.m. range; this producing an adverse effect on the operation of the engine and/or the motor vehicle because there is a limitation on the available horsepower needed to ascend grades and to accelerate from a lower road speed to a higher speed as for example when merging with freeway traffice from an entry ramp, and, additionally, the operator can run the engine at maximum governed road speed for extended periods of time.

SUMMARY OF THE INVENTION

The present invention provides, as a primary object, a novel device to automatically control the maximum road speed of a motor vehicle while not affecting or reducing the available horsepower at lower road speeds.

The present invention provides, as another important object, a device—as above—which includes an instrumentality (here a fluid pressure actuated cylinder) interposed in series in the engine throttle rod operative to mechanically vary its effective length in a manner to limit the available road speed of the motor vehicle to a predetermined maximum; there being means, responsive to the vehicle attaining such predetermined maximum road speed, operative to cause actuation of such instrumentality.

The present invention provides, as still another important object, a throttle control device, as above, which—while allowing the operator use of all available horsepower at lower road speeds—is effective to preclude operation of the motor vehicle at excessive road speeds, thus improving the rate of fuel consumption, preventing undue engine and tire wear, and reducing potential hazards.

The present invention provides, as a further object, a throttle control device which is designed for ease and economy of manufacture.

The present invention provides, as a still further object, a practical, reliable, and durable throttle control device, and one which is exceedingly effective for the purpose for which it is designed.

BRIEF DESCRIPTION OF THE DRAWINGS

FIG. 3 is an enlarged, longitudinal, sectional elevation showing the hydraulic cylinder—which is interposed in series in the throttle rod—contracted as in the non-speed controlling position of FIG. 1.

FIG. 4 is a similar view, but shows the hydraulic cylinder extended as in the speed-controlling position of FIG. 2

DESCRIPTION OF THE PREFERRED EMBODIMENT

Figure 1:
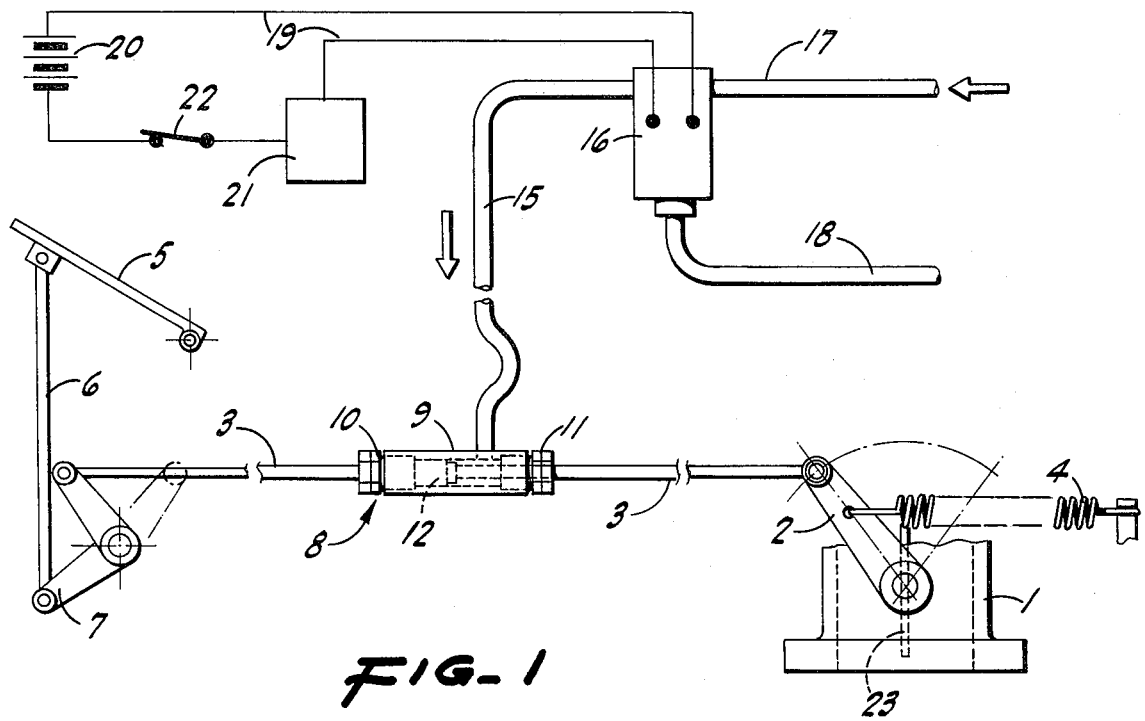
FIG. 1 is a diagrammatic illustration of the throttle control device as arranged with the throttle rod of an internal combustion engine of a motor vehicle; the view showing the normal or non-speed controlling position of the device.
Figure 2:
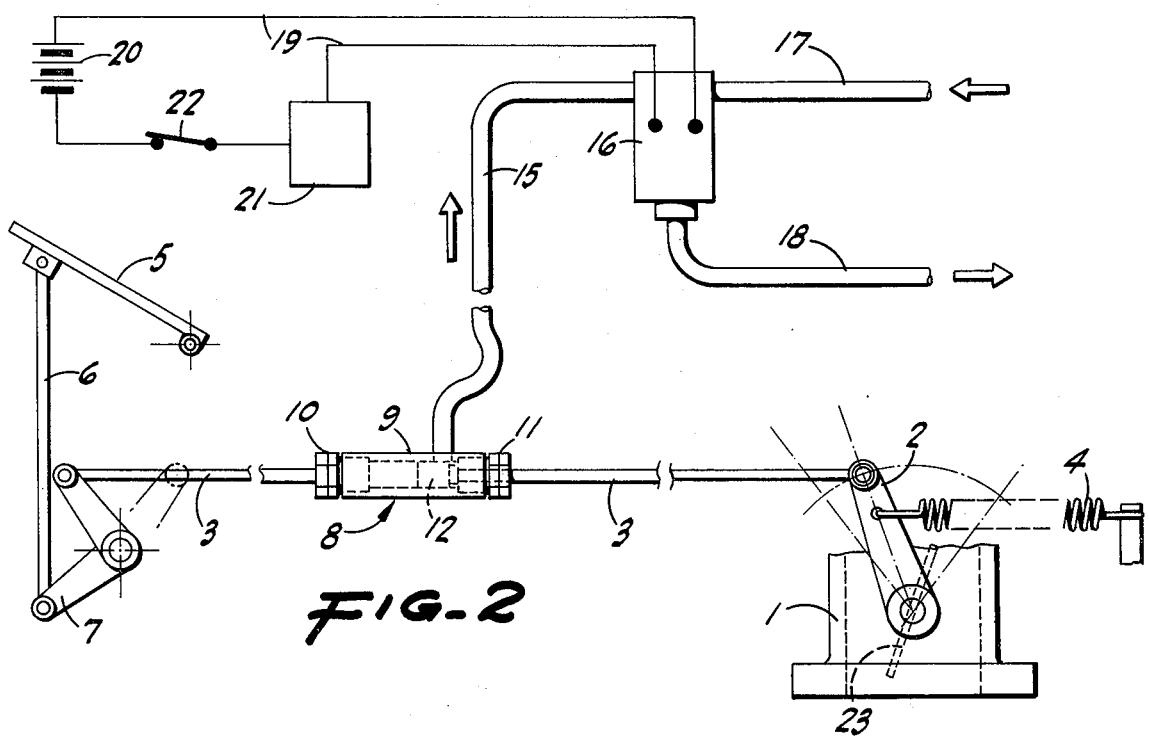
FIG. 2 is a similar view, but shows the device in speed-controlling position.

Referring now more particularly to the drawings and to the characters of reference marked thereon, the speed-controlling device is here shown as used in association with a motor vehicle internal combustion engine which includes a carburetor 1 (or fuel injector) embodying a throttle lever 2 movable in an opening direction by a connected throttle rod 3, and urged in a closing direction by a return spring 4; the throttle rod 3, as usual, being actuated from an operator's foot pedal 5 by a rod 6 connected between such pedal and a motion-translating lever 7 to which said throttle rod is attached.

The speed-control device comprises a relatively small diameter, elongated hydraulic cylinder, indicated generally at 8, interposed in series in the throttle rod 3 intermediate its ends. Such hydraulic cylinder 8 includes a tubular barrel or body 9, threaded in end plugs 10 and 11 with seals, and a piston 12 with a piston ring; the related split-end portion of the throttle rod 3 forming the piston rod 13 of the cylinder, slidably extending in sealed relation through the end plug 11, and inwardly thereof being attached to the piston 12. The other split-end portion of the throttle rod 3 is secured to the end plug 10.

Immediately inwardly of the end plug 11 yet outwardly of the position of the piston 12 when the cylinder 8 is fully extended, the cylinder body 9 is formed with a lateral port 14.

A conduit 15 is attached to cylinder body 9 in communication with the port 14 and thence leads to connection in feed-return relation with a three-way solenoid-actuated valve 16; the conduit 15—at least the portion which is attached to the cylinder body 9—is flexible in order to permit of free longitudinal motion of the hydraulic cylinder 8 with the throttle rod 3.

Another conduit 17 leads in hydraulic pressure feeding relation from a source of hydraulic pressure on the engine to connection with the three-way solenoid-actuated valve 16, while still another conduit 18 is connected in hydraulic pressure relief relation to the three-way valve and thence leads back to the hydraulic sump or reservoir of the engine.

A control circuit 19 extends from a source of electric current (such as the battery 20 or generator/alternator of the motor vehicle) to the solenoid-actuated valve 16; there being a speed-responsive switch 21 interposed in one lead of such circuit. Also, if desired, the ignition switch 22 of the motor vehicle may also be interposed in circuit 19 to permit functioning of the throttle control device only when the engine is in operation.

The speed-responsive switch 21 is actuated to close the circuit 19 when the predetermined maximum road speed of the motor vehicle is attained. Such switch 21 can, for example, be a speedometer with a mechanism which closes a switch at a predetermined road speed.

When the motor vehicle is in normal use—with the ignition switch 22 closed, and the engine operating with the vehicle travelling at less than the predetermined maximum road speed—the speed responsive switch 21 is open and the three-way solenoid valve 16 is in a stance with the hydraulic pressure from conduit 17 delivering to conduit 15 and thence into cylinder 8 causing the latter to fully contract.

In such normally contracted condition of the cylinder 8, the throttle rod 3 is of an effective length such that the throttle valve 23 of the carburetor 1 can be fully opened, and hence there is no restriction on the available road speed of the vehicle. In other words, as long as the motor vehicle travels at less than the predetermined maximum road speed, throttle use is not restricted, and the vehicle operator has at his command all available horsepower of the engine, and as is desirable for effective, convenient, and safe operation of the vehicle.

However, upon the vehicle reaching the predetermined maximum road speed, the present device comes into play and prevents the vehicle operator from continuing to travel at or to exceed such speed. More particularly, when the vehicle reaches such predetermined maximum road speed, the speed-responsive switch 21 closes the circuit 19 and causes energization of the solenoid valve 16. When such solenoid valve is energized, it assumes a stance which shuts off the pressure feed from conduit 17 and releases the pressure from conduit 15 into return conduit 18. Upon this occurrence, the hydraulic pressure in cylinder 8 is released, and such cylinder is then caused—by return spring 4—to fully extend whereby the effective length of the throttle rod 3 is materially increased.

With such increase in the effective length of the throttle rod 3, the vehicle operator cannot cause the throttle valve 23 to open to a position in which the vehicle would travel at or in excess of such predetermined maximum road speed. This provides an effective and positive control of the maximum road speed of the vehicle.

Upon the operator reducing the road speed after the speed control device has functioned, the device automatically returns to its initial or normal condition with the cylinder 8 contracted and the throttle rod 3 in its normal length.

While the above-described device is primarily intended for use to limit the road speed of a motor vehicle to a predetermined maximum, such device may also be employed to prevent full throttle use upon sensing and responding to the existence of certain other-than-normal operating conditions of the engine as, for example, overheating, low oil or air pressure, or the like.

From the foregoing description, it will be readily seen that there has been produced such a throttle control device as substantially fulfills the objects of the invention as set forth herein.

While this specification sets forth in detail the present and preferred construction of the device, still in practice such deviations from such detail may be resorted to as do not form a departure from the spirit of the invention as defined by the appended claims.

I claim:

1. A throttle control device for a motor vehicle having a throttle lever, a spring connected with the throttle lever and yieldably urging the same in a throttle-closing direction, and an operator-actuated throttle rod connected to the throttle lever to move the same in the opposite and throttle-opening direction against the action of the spring; said device comprising a hydraulic pressure-actuated power cylinder interposed in series in the throttle rod, valve-controlled hydraulic pressure conduit means connected to the power cylinder, said conduit means normally delivering, during vehicle operation, hydraulic pressure to the power cylinder to cause contraction thereof to its minimum length whereby to provide undiminished throttle capacity of said rod, and means responsive to the vehicle attaining a predetermined road speed operative in association with said valve-controlled hydraulic pressure conduit means, to cause the latter to relieve the hydraulic pressure from the power cylinder to permit expansion thereof by the spring to its maximum length whereby to diminish the throttle capacity of said rod.

* * * * *